(12) United States Patent
Mazanec et al.

(10) Patent No.: US 6,544,404 B1
(45) Date of Patent: Apr. 8, 2003

(54) OXYGEN SEPARATION PROCESS

(75) Inventors: Terry J. Mazanec, Solon, OH (US);
Thomas L. Cable, Newbury, OH (US)

(73) Assignee: BP Corporation North America Inc., Chicago, IL (US)

( * ) Notice: Subject to any disclaimer, the term of this patent is extended or adjusted under 35 U.S.C. 154(b) by 0 days.

(21) Appl. No.: 08/484,114

(22) Filed: Jun. 7, 1995

Related U.S. Application Data

(63) Continuation-in-part of application No. 08/394,925, filed on Feb. 24, 1995, now Pat. No. 5,591,315, and a continuation-in-part of application No. 08/311,295, filed on Sep. 23, 1994, now abandoned, which is a continuation of application No. 08/228,793, filed on Apr. 15, 1994, now abandoned, which is a division of application No. 07/618,792, filed on Nov. 27, 1990, now Pat. No. 5,306,411, and a continuation-in-part of application No. 07/510,296, filed on Apr. 16, 1990, now abandoned, which is a continuation-in-part of application No. 07/457,327, filed on Dec. 27, 1989, now abandoned, and a continuation-in-part of application No. 07/457,340, filed on Dec. 27, 1989, now abandoned, which is a continuation-in-part of application No. 07/457,384, filed on Dec. 27, 1989, now abandoned, which is a continuation-in-part of application No. 07/357,317, filed on May 25, 1989, now abandoned, which is a continuation-in-part of application No. 07/025,511, filed on Mar. 13, 1987, now Pat. No. 4,933,054.

(51) Int. Cl.$^7$ .............................. B01D 53/22; C25B 1/02
(52) U.S. Cl. ........................ 205/765; 95/45; 95/54; 96/4; 205/629; 205/764; 205/770
(58) Field of Search ................. 204/421–429; 205/764, 765, 770, 763, 629; 95/45, 54; 96/4

(56) References Cited

U.S. PATENT DOCUMENTS

| | | | | |
|---|---|---|---|---|
| RE28,792 E | * | 4/1976 | Ruka et al. | |
| 4,330,633 A | * | 5/1982 | Yoshisato et al. | |
| 4,791,079 A | * | 12/1988 | Hazbun | |
| 4,933,054 A | * | 6/1990 | Mazanec et al. | |
| 5,021,137 A | * | 6/1991 | Joshi et al. | |
| 5,240,480 A | * | 8/1993 | Thorogood et al. | |

OTHER PUBLICATIONS

Iwahara et al, "Mixed Conduction & Oxygen Permeation in Sintered Oxides of a System ZrO2–Tb4O7", Advances in Ceramics, p. 907–914 (1988)*.*

* cited by examiner

*Primary Examiner*—T. Tung
(74) *Attorney, Agent, or Firm*—Thomas A. Yassen

(57) ABSTRACT

The invention relates to a process for the separation of oxygen from an oxygen-containing fluid using novel membranes, formed from perovskitic or multi-phase structures, with a chemically active coating. The process exhibits exceptionally high rates of oxygen flux. The process uses membranes that are conductors of oxygen ions and electrons, which are substantially stable in air over the temperature range of 25° C. to the operating temperature of the membrane.

20 Claims, No Drawings

OXYGEN SEPARATION PROCESS

CROSS-REFERENCE TO RELATED APPLICATIONS

This application is a continuation-in-part of application Ser. No. 08/311,295, filed on Sep. 23, 1994, now abandoned, and of application Ser. No. 08/394,925, filed Feb. 24, 1995, now U.S. Pat. No. 5,591,315. Application Ser. No. 08/394,925 is a continuation of application Ser. No. 08/228,793 filed Apr. 15, 1994, now abandoned, which was a divisional of application Ser. No. 07/618,792 filed Nov. 27, 1990, now U.S. Pat. No. 5,306,411. Application Ser. No. 07/618,792 is a continuation-in-part of U.S. patent application Ser. No. 07/457,327 filed on Dec. 27, 1989, now abandoned; Ser. No. 07/457,340 filed on Dec. 27, 1989, now abandoned, which is a continuation-in-part of U.S. patent application Ser. No. 07/025,511 filed on Mar. 13, 1987 and issued as U.S. Pat. No. 4,933,054 on Jun. 12, 1990; Ser. No. 07/457,384 filed on Dec. 27, 1989, now abandoned; and Ser. No. 07/510,296 filed on Apr. 16, 1990, now abandoned, which is a continuation-in-part of U.S. patent application Ser. No. 07/357,317 filed on May 25, 1989, now abandoned, which are hereby fully incorporated herein by reference.

TECHNICAL FIELD OF THE INVENTION

Applicants have discovered solid state compositions with enhanced product flux, and processes which exploit this property. Membranes, formed from perovskitic or multiphase structures, with a chemically active coating have demonstrated exceptionally high rates of fluid flux. One application is the separation of oxygen of oxygen from oxygen containing fluids. The membranes are conductors of oxygen ions and electrons, and are substantially stable in air over the temperature range of 25° C. to the operating temperature of the membrane.

BACKGROUND OF THE INVENTION

Solid state membranes formed from ion conducting materials are beginning to show promise for use in commercial processes for separating, purifying and converting industrial fluids, notably for oxygen separation and purification. Envisioned applications range from small scale oxygen pumps for medical use to large gas generation and purification plants. Conversion processes are numerous, and include catalytic oxidation, catalytic reduction, thermal treating, distillation, extraction, and the like. Fluid separation technology encompasses two distinctly different membrane materials, solid electrolytes and mixed conductors. Membranes formed from mixed conductors are preferred over solid electrolytes in processes for fluid separations because mixed conductors conduct ions of the desired product fluid as well as electrons, and can be operated without external circuitry such as electrodes, interconnects and power-supplies. In contrast, solid electrolytes conduct only product fluid ions, and external circuitry is needed to maintain the flow of electrons to maintain the membrane ionization/deionization process. Such circuitry can add to unit cost, as well as complicate cell geometry.

Membranes formed from solid electrolytes and mixed conducting oxides can be designed to be selective towards specified product fluids, such as oxygen, nitrogen, argon, and the like, and can transport product fluid ions through dynamically formed anion vacancies in the solid lattice when operated at elevated temperatures, typically above about 500° C. Examples of solid electrolytes include yttria-stabilized zirconia (YSZ) and bismuth oxide for oxygen separation. Examples of mixed conductors include titania-doped YSZ, praseodymia-modified YSZ, and, more importantly, various mixed metal oxides some of which possess the perovskite structure. Japanese Patent Application No. 61-21717 discloses membranes formed from multicomponent metallic oxides having the perovskite structure represented by the formula $La_{1-x}Sr_xCo_{1-y}Fe_yO_{3-d}$ wherein x ranges from 0.1 to 1.0, y ranges from 0.05 to 1.0 and d ranges from 0.5 to 0. Some other pertinent perovskite structures have been described in copending application, Ser. No. 08/311,295, owned by the Assignee of record herein. The subject matter of that application is incorporated herein by reference.

Membranes formed from mixed conducting oxides which are operated at elevated temperatures can be used to selectively separate product fluids from a feedstock when a difference in product fluid partial pressures exists on opposite sides of the membrane. For example, oxygen transport occurs as molecular oxygen is dissociated into oxygen ions, which ions migrate to the low oxygen partial pressure side of the membrane where the ions recombine to form oxygen molecules, or react with a reactive fluid, and electrons migrate through the membrane in a direction opposite the oxygen ions to conserve charge.

The rate at which product fluid ions permeate through a membrane is mainly controlled by three factors. They are (a) the kinetic rate of the feed side interfacial product fluid ion exchange, i.e., the rate at which product fluid molecules in the feed are converted to mobile ions at the surface of the feed side of the membrane; (b) the diffusion rates of product fluid ions and electrons within the membrane; and (c) the kinetic rate of the permeate side interfacial product fluid exchange, i.e., the rate at which product fluid ions in the membrane are converted back to product fluid molecules and released on the permeate side of the membrane, or react with a reactive fluid, such as hydrogen, methane, carbon monoxide, $C_1$–$C_5$ saturated and unsaturated hydrocarbons, ammonia, and the like.

U.S. Pat. No. 5,240,480 to Thorogood, et al, incorporated herein by reference, addressed the kinetic rate of the feed side interfacial gas exchange by controlling the pore size of the porous structure supporting a non-porous dense layer. Numerous references, such as U.S. Pat. No. 4,330,633 to Yoshisato et al, Japanese Kokai No. 56[1981]-92,103 to Yamaji, et al, and the article by Teraoka and coworkers, Chem. Letters, The Chem. Soc. of Japan, pp. 503–506 (1988) describe materials with enhanced ionic and electronic conductive properties.

U.S. Pat. Nos. 4,791,079 and 4,827,071 to Hazbun, incorporated herein by reference, addressed the kinetic rate of the permeate side interfacial gas exchange by utilizing a two-layer membrane in which one layer was an impervious mixed ion and electron conducting ceramic associated with a porous layer containing a selective hydrocarbon oxidation catalyst.

Typical of metal oxide membrane references is Japanese Patent Application 61-21717, described above. When an oxygen-containing gaseous mixture at a high oxygen partial pressure is applied to one side of a membrane having a dense layer formed from the enumerated oxide, oxygen will adsorb and dissociate on the membrane surface, become ionized and diffuse through the solid and deionize, associate and desorb as an oxygen gas stream at a lower oxygen partial pressure on the other side of the membrane.

The necessary circuit of electrons to supply this ionization/deionization process is maintained internally in the oxide via its electronic conductivity. This type of separation process is described as particularly suitable for separating oxygen from a gas stream containing a relatively high partial pressure of oxygen, i.e., greater than or equal to 0.2 atm. Multicomponent metallic oxides which demonstrate both oxygen ionic conductivity and electronic conductivity typically demonstrate an oxygen ionic conductivity ranging from 0.01 ohm-$^{-1}$cm$^{-1}$ to 100 ohm$^{-1}$cm$^{-1}$ and an electronic conductivity ranging from about 1 ohm$^{-1}$cm$^{-1}$ to 100 ohm$^{-1}$cm$^{-1}$ under operating conditions.

Some multicomponent metallic oxides are primarily or solely oxygen ionic conductors at elevated temperatures. An example is $(Y_2O_3)_{0.1}(Zr_2O_3)_{0.9}$ which has an oxygen ionic conductivity of about 0.06 ohm$^{-1}$cm$^{-1}$ at 1000° C. and an ionic transport number (the ratio of the ionic conductivity to the total conductivity) close to 1. European Patent Application EP 0399833A1 describes a membrane formed from a composite of this oxide with a separate electronically conducting phase, such as platinum or another noble metal. The electronic conducting phase will provide the return supply of electrons through the structure allowing oxygen to be tonically conducted through the composite membrane under a partial pressure gradient driving force.

Another category of multicomponent metallic oxides exhibit primarily or solely electronic conductivity at elevated temperatures and their ionic transport numbers are close to zero. An example is $Pr_xIn_yO_z$ which is described in European Patent Application EP 0,399,833A1. Such materials may be used in a composite membrane with a separate oxygen ionic conducting phase such as a stabilized $ZrO_2$. A membrane constructed from a composite of this type may also be used to separate oxygen from an oxygen-containing stream, such as air, by applying an oxygen partial pressure gradient as the driving force. Typically, the multicomponent oxide electronic conductor is placed in intimate contact with an oxygen ionic conductor.

Organic polymeric membranes may also be used for fluid separation. However, membranes formed from mixed conducting oxides offer substantially superior selectivity for such key products as oxygen when compared to polymeric membranes. The value of such improved selectivity must be weighed against the higher costs associated with building and operating plants employing membranes formed from mixed conducting oxides which plants require heat exchangers, high temperature seals and other costly equipment. Typical prior art membranes formed from mixed conducting oxides do not exhibit sufficient permeance (defined as a ratio of permeability to thickness) to justify their use in commercial fluid separation applications.

Oxygen permeance through solid state membranes is known to increase proportionally with decreasing membrane thickness, and mechanically stable, relatively thin membrane structures have been widely studied.

A second article by Teraoka et al, Jour. Ceram. Soc. Japan. International Ed, Vol 97, pp. 458–462, (1989) and J. Ceram. Soc. Japan, International Ed, Vol 97, pp. 523–529, (1989), for example, describes solid state gas separation membranes formed by depositing a dense, nonporous mixed conducting oxide layer, referred to as "the dense layer", onto a porous mixed conducting support. The relatively thick porous mixed conducting support provides mechanical stability for the thin, relatively fragile dense, nonporous mixed conducting layer. Structural failures due to thermomechanical stresses experienced by the membranes during fabrication and use were substantially minimized due to the chemical compatibility of the respective membrane layers. Based upon considerations limited to dense layer thickness, Teraoka and coworkers expected the oxygen flux to increase by a factor of 10 for a membrane having a mixed conducting porous layer and a thin mixed conducting dense layer compared to a standard single layered dense, sintered mixed conducting disk. However, they obtained an increase of less than a factor of two.

Perovskitic structures include true perovskites that have a three dimensional cubic array of small diameter metal ion octahedra, as well as structures that incorporate a perovskite-like layers or layer, i.e., a two dimensional array of small diameter metal ion octahedra arranged in a two dimensional square array. These perovskite-like arrays are charge stabilized by larger diameter metal ions, or other charged layers. Examples of perovskitic structures include cubic perovskites, brownmillerites, Aurivillius phases, and the like. A description of the relation between perovskites and some of the various perovskitic phases is presented in L. Katz and R. Ward, *Inorg. Chem.* 3, 205–211, (1964), incorporated herein by reference.

These layered structures can accommodate vacancies of oxygen ions, and the ordering of these vacancies can lead to structural variations, such as the brownmillerite phase. Brownmillerites are perovskites that have one sixth of the oxygen ions missing with the resulting oxygen ion vacancies ordered into continuous lines within the crystal. An example is $SrFeO_{3-x}$, as described by S. Shin, M. Yonemura, and H. Ikawa in *Mater Res Bull* 13, 1017–1021 (1978). Under conditions where x=0, the structure is a regular, cubic perovskite structure. As conditions of temperature and pressure are varied so that x increases, the oxygen vacancies that are introduced are at first randomly scattered throughout the crystal, or "disordered". However, as x approaches 0.5 the vacancies can become "ordered", i.e., the vacancies form a regular pattern throughout the crystal. When exactly one sixth of the oxygen ions are absent (X=0.5) and the resulting vacancies are "ordered", the phase is called a brownmillerite.

Aurivillius phases, sometimes called lamellar perovskites, consist of layers of perovskite wherein the larger diameter metal cations have, in part or in toto, been replace by layers of another oxide, commonly $(Bi_2O_2)^{2+}$, as described in *Catalysis Letters* 16, p 203–210 (1992) by J. Barrault, C. Grosset, M. Dion, M. Ganne and M. Tournoux. Their general formula is $[Bi_2O_2][A_{n-1}B_nO_{3n+1}]$, where "A" designates the larger diameter metal ions, and "B" designates the smaller diameter metal ions. Wide latitude of substitution is possible for the A and B metals in the perovskite layer, and for Bi in the interleaving layers of $Bi_2O_2$, as described by A. Castro, P. Millan, M. J. Martinez-Lope and J. B. Torrance in *Solid State Tonics* 63–65, p 897–901 (1993), incorporated herein by reference. The so-called superconductors, such as $YBa_2Cu_3O_{7-x}$, are also perovskitic structures, with another type of ordered vacancies, as described in W. Carrillo-Cabrera, H-D Wiemhofer and W. Gopel, *Solid State Ionics*, 32/33, p 1172–1178 (1989).

Researchers are continuing their search for solid state conductive membranes which exhibit superior flux without sacrificing mechanical and physical compatibility of the composite membrane.

BRIEF SUMMARY OF THE INVENTION

The present invention relates to novel mixed conductor membranes which are capable of separating industrial fluid streams. The membranes have a chemically active coating and a structure and composition that forms a substantially perovskitic structure, substantially stable in air over the temperature range of 25° C. to the operating temperature of the membrane, such that enhanced flux is observed compared to prior art solid state membranes. The upper range of membrane operating temperature would be about 400° C. for partial oxidation of $C_2$–$C_4$ hydrocarbons and oxygen production processes; about 700° C. for selected partial oxidation and oxygen production processes, as well as processes for the removal of oxygen from industrial gases and industrial fluids; and about 850° C. for previously mentioned processes under certain circumstances, as well as for partial oxidation of methane and natural gases.

While membranes are known which comprise a mixed conducting oxide layer, the fluid impermeable membranes of the present invention have a composition that forms a substantially perovskitic structure. Such structures exhibit enhanced flux, particularly of oxygen. A porous coating of metal or metal oxide increases the kinetic rate of the feed side interfacial fluid exchange, the kinetic rate of the permeate side interfacial fluid exchange, or both. Membranes fabricated from such material and in such manner display increased flux.

The fluid impermeable membranes according to the invention are formed from a mixture of at least two different metal oxides wherein the multicomponent metallic oxide form a perovskitic structure which demonstrates electron conductivity as well as product fluid ion conductivity at temperatures greater than about 400° C. These materials are commonly referred to as mixed conducting oxides.

Suitable mixed conducting oxides are represented by the structure $$[A_{1-x}A'_x]BO_{3-\delta}$$

or $$[Bi_{2-y}A_yO_{2-\delta'}][(A_{1-x}A'_x)_{n-1}B_nO_{3n+1-\delta''}]$$

wherein A is chosen from the group consisting of Ca, Sr, Ba, Bi, Pb, K, Sb, Te, Na and mixtures thereof; A' is chosen from the group consisting of La, Y, Ce, Pr, Nd, Pm, Sm, Eu, Gd, Tb, Dy, Ho, Er, Tm, Yb, Lu, Th, U, and mixtures thereof; B is chosen from the group consisting of Fe, Mg, Cr, V, Ti, Ni, Ta, Mn, Co, V, Cu, and mixtures thereof; x is not greater than 0.9, preferably not greater than about 0.06, more preferably not greater than 0.4, most preferably not greater than 0.25; y is an integer from 0 to 2; n is an integer from 1 to 7; and $\delta$, $\delta'$ and $\delta''$ are determined by the valence of the metals.

The mixed conducting oxides are formed into fluid impermeable membranes. At least one surface of the fluid impermeable membrane is coated with a porous layer of metal or metal oxide. The coating acts as a chemically active site which enhances the kinetic rate of the interfacial fluid exchange at the fluid impermeable membrane surface.

The current invention is directed towards a solid state membrane, comprising a structure selected from the group consisting of substantially perovskitic material, an intimate, gas-impervious, multi-phase mixture of an electronically-conductive phase and an oxygen ionconductive phase, and combinations thereof; and a porous coating selected from the group consisting of metals, metal oxides and combinations thereof.

The current invention is also directed towards the use of one or more membranes formed from the coated mixed conductors described. Suitable uses of such membranes include processes for the partial oxidation of $C_{1-C4}$ hydrocarbons, and oxygen separation, production and removal from oxygen-containing fluids, particularly air, or air diluted with other fluids.

DETAILED DESCRIPTION OF THE INVENTION

The present invention relates perovskitic membranes with a chemically active coating, and processes employing such membranes. One such process is separating oxygen from oxygen-containing feeds at elevated temperatures. The membranes are conductors of product fluid ions and electrons, and are of a composition that forms a substantially perovskitic structure. Specific compositions stabilize a perovskitic structure in the mixed conducting fluid impermeable membrane. Membranes fabricated from such material display increased flux. More particularly, a mixed conductor membrane wherein the fluid impermeable membrane has the composition $$[A_{1-x}A'_x]BO_{3-\delta} \qquad \text{Equation 1}$$

or $$[Bi_{2-y}A_yO_{2-\delta'}][(A_{1-x}A'_x)_{n-1}B_nO_{3n+1-\delta''}] \qquad \text{Equation 2}$$

wherein A is chosen from the group consisting of Ca, Sr, Ba, Bi, Pb, K, Sb, Te, Na and mixtures thereof; A' is chosen from the group consisting of La, Y, Ce, Pr, Nd, Pm, Sm, Eu, Gd, Tb, Dy, Ho, Er, Tm, Yb, Lu, Th, U, and mixtures thereof; B is chosen from the group consisting of Fe, Mg, Cr, V, Ti, Ni, Ta, Mn, Co, V, Cu, and mixtures thereof; x is not greater than 0.9; y is an integer from 0 to 2; n ia an integer from 1 to 7; and $\delta$, $\delta'$, and $\delta\Delta$ are determined by the valence of the metals; wherein the perovskitic phase is substantially stable in air over the temperature range of 25–950° C.; and coated with a porous layer of metal or metal oxide selected from the group consisting of platinum, silver, palladium, lead, cobalt, nickel, copper, bismuth, samarium, indium, tin, praseodymium, their oxides, and combinations of the same, has been shown to exhibit unexpectedly high fluid transport fluxes, particularly transport fluxes of oxygen.

Applicants' discovery can be more fully understood by developing an understanding of the mechanism by which product fluids are ionically transported through the mixed conducting oxide membrane. Typical product fluids include industrial gases, such as oxygen, nitrogen, argon, hydrogen, helium, neon, air, carbon monoxide, carbon dioxide, synthesis gases (mixtures of CO and $H_2$), and the like. The product fluid flux observed by conventional mixed conductor membranes is controlled by surface kinetic limitations and bulk diffusion limitations. Surface kinetic limitations are constraints to product fluid flux caused by one or more of the many steps involved in converting a feed fluid molecule on the feed side of the mixed conductor membrane into mobile ions and converting the ions back to product fluid molecules, or reacting the ions with a reactant fluid molecule, on the permeate side of the mixed conductor membrane. Bulk diffusion limitations are constraints on fluid flux relating to the diffusivity of product fluid ions through the fluid impermeable membrane material.

Membranes composed substantially of perovskitic phase materials exhibit high overall product fluid flux. However, the perovskitic phase is not formed in all mixed conducting oxide materials or, if formed, is not stable over the required range of fabricating and operating conditions. For instance, membranes formed from hexagonal phase materials exhibit little, if any, oxygen flux. To produce an effective oxygen membrane, therefore, the membrane composition must maintain a substantially high fraction of stable perovskitic phase in the membrane at operating conditions.

To complement the enhanced bulk diffusion rate through the fluid impermeable membrane, the kinetic rates of interfacial fluid exchange must be examined. If the rate at which the feed fluid is converted to mobile ions on the feed side of the fluid impermeable membrane, or the rate at which the mobile ions in the fluid impermeable membrane are converted back to product fluid molecules, is slower than the fluid impermeable membrane bulk diffusion rate, the overall product permeation rate will be limited to the slowest of the three processes.

Applicants have discovered a novel composition which stabilizes the perovskitic phase in fluid impermeable membranes with compositions previously unable to sustain a stable perovskitic phase over the range from ambient temperature and pressure in air to the conditions used for product fluid separation. In particular, specific compositions stabilize a substantially cubic perovskite layer in a substantially perovskitic structure in ABO materials. Porous coatings on one or more surface of the cubic perovskite material increases the rate of fluid adsorption, ionization, recombination or desorption, as well as increasing the overall fluid flux rate.

The present invention provides coated membranes, and permits the fabrication of mixed conductor oxide structures that are substantially perovskitic phase. Membranes made from such material and in such manner exhibit relatively high overall bulk diffusion rates.

The claimed membranes comprise the composition described in Equation 1 and Equation 2, having no connected through porosity, a substantially stable perovskitic structure in air at 25–950° C., coated with a porous layer of metal, metal oxides, or mixtures of metals and metal oxides, and the capability of conducting electrons and product fluid ions at operating temperatures.

Multicomponent metallic oxides suitable for practicing the present invention are referred to as "mixed" conducting oxides because such multicomponent metallic oxides conduct electrons as well as product fluid ions at elevated temperatures. Suitable mixed conducting oxides are represented by the compositions of Equation 1 and 2, which yield a substantially stable cubic perovskite structure in air at 25° C. to the operating point of material. Materials described in the prior art exhibit significantly lower product fluid fluxes.

The thickness of the material can be varied to ensure sufficient mechanical strength of the membrane. As discussed previously, thinner membranes increase the overall bulk diffusion rate for a given membrane material. To exploit this phenomena, thinner membranes may be supported by one or more porous supports. The minimum thickness of unsupported mixed conductor membranes of Applicants' invention is about 0.01 mm, preferably about 0.05 mm, most preferably about 0.1 mm. The maximum thickness of unsupported mixed conductor membranes of Applicants' invention is about 10 mm, preferably about 2 mm, most preferably about 1 mm.

The minimum thickness of supported mixed conductor membranes of Applicants' invention is about 0.0005 mm, preferably about 0.001 mm, most preferably about 0.01 mm. The maximum thickness of supported mixed conductor membranes of Applicants' invention is about 2 mm, preferably about 1 mm, most preferably about 0.1 mm.

In addition to the increased product fluid flux, the membranes of the present invention exhibit stability over a temperature range from 25° C. to the operating temperature of the membrane and an oxygen partial pressure range from 1 to about $1 \times 10^6$ atmosphere (absolute) without undergoing phase transitions. Substantially stable perovskitic structures include all structures with no less than 90% perovskitic phase material, preferably no less than 95% perovskitic phase material, and most preferably no less than 98% perovskitic phase material, which do not exhibit permanent phase transitions over a temperature range from 25° C. to 950° C. and an oxygen partial pressure range from 1 to about $1 \times 10^{-6}$ atmosphere (absolute).

Applicants' invention also includes chemically-active coated membranes of an intimate, fluid-impervious, multi-phase mixture of any electronically-conducting material with any product fluid ion-conducting material and/or a gas impervious "single phase" mixed metal oxide having a perovskite structure and having both electron-conductive and product fluid ion-conductive properties. The phrase "fluid-impervious" is defined herein to mean "substantially fluid-impervious or gas-tight" in that the mixture does not permit a substantial amount of fluid to pass through the membrane (i.e., the membrane is non-porous, rather than porous, with respect to the relevant fluids). In some cases, a minor degree of perviousness to fluids might be acceptable or unavoidable, such as when hydrogen gas is present.

The term "mixtures" in relation to the solid multi-component membrane includes materials comprised of two or more solid phases, and single-phase materials in which the atoms of the various elements are intermingled in the same solid phase, such as in yttria-stabilized zirconia. The phrase "multi-phase mixture" refers to a composition which contains two or more solid phases interspersed without forming a single phase solution.

In other words, the multi-phase mixture is "multiphase", because the electronically-conductive material and the product fluid ion-conductive material are present as at least two solid phases in the fluid impervious solid membrane, such that the atoms of the various components of the multi-component membrane are, for the most part, not intermingled in the same solid phase.

The multi-phase solid membrane of the present invention differs substantially from "doped" materials known in the art. A typical doping procedure involves adding small amounts of an element, or its oxide (i.e., dopant), to a large amount of a composition (i.e., host material), such that the atoms of the dopant become permanently intermingled with the atoms of the host material during the doping process, whereby the material forms a single phase. The multi-phase solid membrane of the present invention, on the other hand, comprises a product fluid ion conductive material and an electronically conductive material that are not present in the dopant/host material relationship described above, but are present in substantially discrete phases. Hence, the solid membrane of the present invention, rather than being a doped material, may be referred to as a two-phase, dual-conductor, multi-phase, or multi-component membrane.

The multi-phase membrane of the present invention can be distinguished from the doped materials by such routine procedures as electron microscopy, X-ray diffraction analysis, X-ray adsorption mapping, electron diffraction analysis, infrared analysis, etc., which can detect differences in composition over a multi-phase region of the membrane.

Typically, the product fluid ion-conducting materials or phases are solid solutions (i.e., solid "electrolytes") formed between oxides containing divalent and trivalent cations such as calcium oxide, scandium oxide, yttrium oxide, lanthanum oxide, etc., with oxides containing tetravalent cations such as zirconia, thoria and ceria or the product fluid ion-conducting materials or phases comprise a product fluid ion-conductive mixed metal oxide of a perovskite structure. Their higher ionic conductivity is believed to be due to the existence of product fluid ion site vacancies. One product fluid ion vacancy occurs for each divalent or each two trivalent cations that are substituted for a tetravalent ion in the lattice. Any of a large number of oxides such as yttria stabilized zirconia, doped ceria, thoria-based materials, or doped bismuth oxides may be used. Some of the known solid oxide transfer materials include $Y_2O_3$-stabilized $ZrO_2$, CaO-stabilized $ZrO_2$, $Sc_2O_3$-stabilized $ZrO_2$, $Y_2O_3$-stabilized $Bi_2O_3$, $Y_2O_3$-stabilized $CeO_2$, CaO-stabilized $CeO_2$, $ThO_2$, $Y_2O_3$-stabilized $ThO_2$, or $ThO_2$, $ZrO_2$, $Bi_2O_3$, $CeO_2$, or $HfO_2$ stabilized by addition of any one of the lanthanide oxides or CaO. Many other oxides are known which have demonstrated product fluid ion-conducting ability which could be used in the multi-phase mixtures, and they are included in the present concept.

Preferred among these solid electrolytes are the $Y_2O_3$-(yttria) and CaO-(calcia) stabilized $ZrO_2$ (zirconia) materials. These two solid electrolytes are characterized by their high ionic conductivity, their product fluid ion conduction over wide ranges of temperature and product fluid pressure, and their relatively low cost.

Applicants have also discovered that since perovskitic structures exhibit excellent electron-conductive and product fluid ion-conductive properties, in multi-phase materials, perovskitic materials may be used as the electronically-conductive material, the product fluid ion-conductive material, or both. The resulting multi-phase mixture can be coated with a porous, chemically active material to produce a solid state membrane with enhanced flux.

The present invention can consist of a solid state membrane comprising an intimate, gas-impervious, multi-phase mixture comprising from about 1 to about 75 parts by volume of the electronically-conductive phase and from about 25 to about 99 parts by volume of the product ion-conductive phase.

The porous coating comprises metal or metal oxide selected from the group consisting of platinum, silver, palladium, lead, cobalt, nickel, copper, bismuth, samarium, indium, tin, praseodymium, their oxides, and combinations of the same, where the coating exhibits oxygen ionic conductivity less than about 1.0 $ohm^{-1}cm^{-1}$, preferably less than about 0.1 $ohm^{-1}cm^{-1}$, most preferably less than about 0.01 $ohm^{-1}cm^{-1}$ under operating conditions. The porous coating may be applied using standard applications techniques including, but not limited to spraying, dipping, laminating, pressing, implanting, sputter deposition, chemical deposition, and the like.

The membranes of the present invention can be used to recover product fluid, such as oxygen, from a product fluid-containing feed fluid by delivering the product fluid-containing feed fluid into a first compartment which is separated from a second compartment by the subject membrane, establishing a positive product fluid partial pressure difference between the first and second compartments by producing an excess product fluid partial pressure in the first compartment and/or by producing a reduced product fluid partial pressure in the second compartment; contacting the product fluid-containing feed fluid with the membrane at a temperature greater than about 400° C. to separate the product fluid-containing feed into a product fluid-enriched permeate stream and a product fluid-depleted effluent stream.

A difference in product fluid partial pressure between the first and second compartments provides the driving force for effecting the separation when the process temperature is elevated to a sufficient temperature to cause product fluid in the product fluid-containing feed fluid residing in the first compartment to adsorb onto the first surface of the membrane, become ionized via the membrane and to be transported through the fluid impermeable membrane in the ionic form. A product fluid-enriched permeate is collected or reacts in the second compartment wherein ionic product fluid is converted into the neutral form by the release of electrons at the second surface of the membrane, in the second compartment.

A positive product fluid partial pressure difference between the first and second compartments can be created by compressing the feed fluid, such as air or other oxygen-containing fluid in an oxygen separation process, in the first compartment to a pressure sufficient to recover the product fluid-enriched permeate stream at a pressure of greater than or equal to about one atmosphere. Typical pressures range from about 15 psia to about 250 psia and the optimum pressure will vary depending upon the amount of product fluid in the product fluid-containing feed. Conventional compressors can be utilized to achieve the necessary product fluid partial pressure. Alternately, a positive product fluid partial pressure difference between the first and second compartments can be achieved by evacuating the second compartment to a pressure sufficient to recover the product fluid-enriched permeate. Evacuation of the second compartment may be achieved mechanically, using compressors, pumps and the like; chemically, by reacting the product fluid-enriched permeate; thermally, by cooling the product fluid-enriched permeate; or by other methods known in the art. Additionally, the present invention may utilize an increase of product fluid partial pressure in the first compartment while simultaneously reducing the product fluid partial pressure in the second compartment, by the means described above. The relative pressures may also be varied during operation, as necessary to optimize product fluid separation, or necessitated by process which supply feeds to, or accept product streams from, the two compartments.

Recovery of the product fluid-enriched permeate may be effected by storing the substantially product fluid-enriched permeate in a suitable container or transferring the same to another process. For oxygen production processes, the product fluid-enriched permeate typically comprises pure oxygen or high purity oxygen defined as generally containing at least about 90 vol % $O_2$, preferably more than about 95 vol % $O_2$ and especially more than 99 vol % $O_2$ Although oxygen separation and purification is described herein for illustrative purposes, the present invention may be used in similar fashion for separation, purification and reaction of other product fluids including, but not limited to, nitrogen, argon, hydrogen, helium, neon, air, carbon monoxide, carbon dioxide, synthesis gases, and the like The following example is provided to further illustrate Applicants' invention. The example is illustrative and is not intended to limit the scope of the appended claims.

EXAMPLE

Example 1

A mixed conductor fluid impermeable membrane of nominal composition $[La_{0.2}Sr_{0.8}][Co_{0.1}Fe_{0.7}Cr_{0.2}Mg_{0.01}]O_{3-\delta}$ was prepared in a manner similar to the examples described in U.S. Pat. No. 5,061,682, incorporated herein by reference. 4232.60 grams of $Sr(NO_3)_2$, 773.80 grams of $La_2O_3$ (Alpha, dried at 850° C.), 6927.80 grams of $Fe(NO_3) \cdot 9H_2O$), 730.50 grams of $Co(NO_3)_3 \cdot 6H_2O$, and 64.10 grams of $Mg(NO_3)_2$ were added to approximately 30 liters of deionized water containing dissolved sucrose.

A portable spray-dryer was used to spray-dry the ceramic precursor solution described above. A suitable portable spray-dryer is available from Niro Atomizer of Columbia, Md. The spray-dryer includes a centrifugal atomizer capable of speeds up to 40,000 rpm. The atomizer sits near the top of a drying chamber that has an inner diameter of 2 feet, 7 inches, with a 2-foot cylindrical height and a 60° conical bottom. The centrifugal atomizer and drying chamber are made from stainless steel. The drying chamber is coupled to an electric air heater for providing drying air to the drying chamber. The drying air is drawn through the drying chamber by a blower positioned downstream from the drying chamber. The spraydryer includes a cyclone separator that receives the drying air and dry product from the bottom of the drying chamber. The cyclone separator separates the dry product from the exhausted drying air. The bottom of the cyclone separator includes an outlet that allows the dried particles to gravitate into a vertically oriented tube furnace capable of maintaining an air temperature of about 300°–450° C. The dried particles are pyrolyzed in the tube furnace. The tube furnace has a height sufficient to provide a residence time for the freely gravitating particles of about 0.5 to 2.0 seconds. The bottom of the tube furnace communicates with a collection chamber where the ceramic particles are collected.

The ceramic precursor solution described above was introduced into the spray-dryer chamber at a flow rate of about 1.8 liters per hour. The centrifugal atomizer spinning at about 30,000 RPM broke up the precursor solution into small droplets having a diameter on the order of about 20–50 microns. The air flow through the drying chamber and cyclone ranged between about 35–40 standard cubic feet per minute. The air entering the drying chamber was preheated to about 375° C. As the small droplets were forcefully convected toward the bottom of the drying chamber, they became fully dehydrated down to a critical state of dehydration such that their diameter was reduced to about 10.0 microns or less. The temperature of the drying gas at the bottom of the drying chamber was approximately 125° C., which ensures substantially all the water was removed from the particles in the spraydryer. The dried powder and drying air were then separated from each other in the cyclone separator. The separated powder fell due to gravity through the tube furnace, which was preheated to about 490° C. The particles' residence time in the furnace ranged from about 0.5–2.0 seconds. The temperature in the tube furnace initiated the exothermic anionic oxidation-reduction reaction between the nitrate ions and the oxides in the individual particles. The combustion by-products ($CO_2$ and water vapor) were passed through the system and out the exhaust, while the reacted particles dropped into the collection jar. About 1000 grams of particles were collected.

The resulting powders were analyzed, and had the composition $[La_{0.19}Sr_{0.8}][Co_{0.1}Fe_{0.69}Cr_{0.2}Mg_{0.01}]O_x$. A 190.10 g portion of the resulting powder, 3.88 g polyvinyl butyral resin (Monsanto, St. Louis Mo.), and 160 ml toluene were charged, with 820 g of $ZrO_2$ media to a jar mill, and milled for approximately 3 hours. 20 ml absolute ethanol was added, and the slurry allowed to stand, without milling, overnight. The product was filtered, and the resulting powder was dried and screened to pass though a 60 mesh Tyler screen. X-ray diffraction (XRD) of the powder showed that the material was 100% cubic perovskite phase.

A 4 g portion of the screened powder was pressed into a 1⅜" diameter disk under 28,000 psi applied pressure. The disk was fired in air at 105° C. for 15 minutes, the temperature increased to 1300° C. over the course of 13 hours and maintained for 1 hour, then cooled to ambient temperature. The disk was polished on both sides with 500 grit SiC with isopropanol to a final thickness of 1 mm. 3.0 wt % $Bi_2O_3$ (Fluka) was added to platinum ink (Englehardt), and the resulting mixture was diluted with toluene to form a low viscosity coating fluid. Both sides of the polished disk were coated with the fluid over an area of approximately 2.0 cm The coated disk was heated in air to 1065° C. over a period of 10.5 hours, then cooled to ambient temperature. The coated disk was bonded to a 1 inch outside diameter mullite tube with a ⅛" thick Pyrex ring, and the exposed surface area measured to be approximately 2 $cm^2$.

The mullite tube, disk, and gas handling equipment were placed in a thermistatically controlled electric heater. The disk was heated in stagnant air to 850° C. as indicated by a thermocouple affixed to the mullite tube approximately 1 cm from the tube/disk bond. Air flow at the rate of 1.0 l/min was initiated on one side of the disk, and helium permeate feed flow at 150 $cm^3$/min started on the other side of the disk. The effluent helium permeate was analyzed using on-line gas chromatography. The permeate was also analyzed for nitrogen, to permit correction for any air leakage into the permeate stream.

Oxygen flux of the membrane was calculated using the expression:

$$q_{O_2} = [q_P * (x_{O_2P} - 0.256 * x_{N_2P}) * P_0 / 760 * 273 / T_0]/100$$

where $q_{O_2}$=Oxygen flux ($cm^3$/min);
$q_P$=Permeate exhaust flow rate ($cm^3$/min);
$x_{O_2P}$=Oxygen concentration in permeate exhaust (%);
$x_{N_2P}$=Nitrogen concentration in permeate exhaust (%);
$P_0$=Atmospheric pressure (mm Hg, abs.); and
$T_0$=Ambient temperature (degrees K).

Oxygen flux was normalized to correct for membrane disk thickness variations using the expression:

$$q'_{O_2} = q_{O_2} * L$$

where $q'_{O_2}$=Oxygen flux normalized for thickness (cm 3/min-mm);
$q_{O_2}$=Oxygen flux (cm 3/min); and
L=Thickness of membrane disk (mm).

Oxygen flux per unit area was calculated by dividing the oxygen flux normalized for thickness ($q'_{O_2}$) by the membrane disk area, measured in $cm^2$.

Operating characteristics of the disk were evaluated for over 50 hours. Test data are supplied in Table 1, below. Ambient temperature ($T_o$) was maintained at 293° K, and Po was 741 mm Hg for all data points. The air feed rate was maintained at 1000 sccm.

The data of Table 1 show the excellent long-term stability of the material in air at elevated temperatures, and the high oxygen flux.

TABLE 1

| Time (hours) | Membrane Temp (Deg. C.) | Permeate (sccm) | Permeate analysis ($x_{O2P}$) | ($x_{N2P}$) | qO2 (cc/min) | q'O2 (cc/cm2/min) |
|---|---|---|---|---|---|---|
| 1 | 850 | 154 | 0.163 | 0.017 | 0.256 | 0.128 |
| 6 | 850 | 152 | 0.159 | 0.017 | 0.248 | 0.124 |
| 53 | 850 | 154 | 0.087 | 0.020 | 0.128 | 0.064 |

What is claimed is:

1. A process for the separation of oxygen from an oxygen containing fluid, comprising contacting said oxygen containing fluid with at least one solid state membrane, wherein said solid state membrane comprises A) a structure selected from the group consisting of:
   a) a fluid-impervious, electronically-conductive and ion-conductive, substantially perovskitic material;
   b) an intimate, gas-impervious, multi-phase mixture of an electronically-conductive phase and an oxygen ion-conductive phase; and
   c) combinations thereof; and
B) a porous coating selected from the group consisting of metals, metal oxides and combinations thereof.

2. The process of claim 1, wherein said structure is substantially perovskitic material.

3. The process of claim 2, wherein said perovskitic material is selected from the group consisting of cubic perovskites, brownmillerites, Aurivillius phases, and combinations thereof.

4. The process of claim 2, wherein said perovskitic material is a cubic perovskite.

5. The process of claim 2, wherein said perovskitic material has a composition $$[Bi_{2-y}A_yO_{2-\delta'}][(A_{1-x}A'_x)_{n-1}B_nO_{3n+1-\delta''}],$$

wherein
   A is selected from the group consisting of Ca, Sr, Ba, Bi, Pb, Ca, K, Sb, Te, Na and mixtures thereof;
   A' is selected from the group consisting of La, Y, Ce, Pr, Nd, Pm, Sm, Eu, Gd, Tb, Dy, Ho, Er, Tm, Yb, Lu, Th, U, and mixtures thereof;
   B is selected from the group consisting of Fe, Mg, Cr, V, Ti, Ni, Ta, Mn, Co, V, Cu, and mixtures thereof;
   x is not greater than about 0.9;
   y is an integer from 0 to 2;
   n is an integer from 1 to 7; and
   $\delta'$ and $\delta''$ are determined by the valence of the metals.

6. The process of claim 2, wherein said perovskitic material is a brownmillerite.

7. The process of claim 2, wherein said perovskitic material is selected from the group consisting of Aurivillius phases.

8. The process of claim 2, wherein said porous coating is selected from the group consisting of platinum, silver, palladium, lead, cobalt, nickel, copper, bismuth, samarium, indium, tin, praseodymium, their oxides, and combinations of the same.

9. The process of claim 1, wherein said perovskitic material has a composition selected from the group consisting of $$[A_{1-x}A'_x]BO_{3-\delta},$$

$$[Bi_{2-y}A_yO_{2-\delta'}][(A_{1-x}A'_x)_{n-1}B_nO_{3n+1-\delta''}],$$

and combination thereof, wherein
   A is selected from the group consisting of Ca, Sr, Ba, Bi, Pb, Ca, K, Sb, Te, Na and mixtures thereof;
   A' is selected from the group consisting of La, Y, Ce, Pr, Nd, Pm, Sm, Eu, Gd, Tb, Dy, Ho, Er, Tm, Yb, Lu, Th, U, and mixtures thereof;
   B is selected from the group consisting of Fe, Mg, Cr, V, Ti, Ni, Ta, Mn, Co, V, Cu, and mixtures thereof;
   x is not greater than about 0.9;
   y is an integer from 0 to 2;
   n is an integer from 1 to 7; and
   $\delta$, $\delta'$, and $\delta''$ are determined by the valence of the metals.

10. The process of claim 1, wherein said perovskitic material has a composition $$[A_{1-x}A'_x]BO_{3-\delta}$$

wherein
   A is selected from the group consisting of Ca, Sr, Ba, Bi, Pb, Ca, K, Sb, Te, Na and mixtures thereof;
   A' is selected from the group consisting of La, Y, Ce, Pr, Nd, Pm, Sm, Eu, Gd, Tb, Dy, Ho, Er, Tm, Yb, Lu, Th, U, and mixtures thereof;
   B is selected from the group consisting of Fe, Mg, Cr, V, Ti, Ni, Ta, Mn, Co, V, Cu, and mixtures thereof;
   x is not greater than about 0.9;
   y is an integer from 0 to 2; and
   $\delta$ is determined by the valence of the metals.

11. The process of claim 10, wherein A is selected from the group consisting of Ca, Sr, Ba, Bi, and mixtures thereof.

12. The process of claim 11, wherein A is Sr.

13. The process of claim 10, wherein A' is selected from the group consisting of of La, Y, Ce, Pr, Nd, and mixtures thereof.

14. The process of claim 13, wherein A' is La.

15. The process of claim 10, wherein B is selected from the group consisting of Fe, Mg, Cr, V, Ti, Ni, Co, V, and mixtures thereof.

16. The solid state membrane of claim 10 wherein A is Sr, A' is La, and x is less than about 0.25.

17. The process of claim 10, wherein x is not greater than about 0.6.

18. The process of claim 10, wherein x is not greater than about 0.4.

19. The process of claim 1 wherein said electronically-conductive phase comprises silver, gold, platinum, palladium, rhodium, ruthenium, bismuth oxide, a praeseodymium-indium oxide mixture, a cerium-lanthanum oxide mixture, a niobium-titanium oxide mixture, or an electron-conductive mixed metal oxide of a perovskite structure, or a mixture thereof and the oxygen ion-conductive phase comprises yttria- or calcia-stabilized zirconia, ceria or bismuth oxide, or an oxygen ion-conductive mixed metal oxide of a perovskite structure.

20. The process of claim 1 wherein said structure comprises an intimate, gas-impervious, multi-phase mixture comprising from about 1 to about 75 parts by volume of the electronically-conductive phase and from about 25 to about 99 parts by volume of the product ion-conductive phase.

* * * * *